United States Patent [19]

Buan

[11] 4,336,529

[45] Jun. 22, 1982

[54] POSTAGE METER HAVING SHIELDED KEYBOARD TO PROTECT AGAINST ELECTROMAGNETIC RADIATION

[75] Inventor: Danilo P. Buan, Easton, Conn.

[73] Assignee: Pitney Bowes Inc., Stamford, Conn.

[21] Appl. No.: 122,791

[22] Filed: Feb. 19, 1980

[51] Int. Cl.³ .......................... G06F 3/02; G07G 1/00
[52] U.S. Cl. .............................. 340/365 R; 200/5 A; 235/101; 361/416
[58] Field of Search ........... 340/365 R, 384 E, 365 E; 200/5 A; 361/351, 352, 400, 424, 416; 235/101; 364/200 MS File, 900 MS File; 307/113

[56] References Cited

U.S. PATENT DOCUMENTS

| | | | |
|---|---|---|---|
| 3,668,417 | 6/1972 | Sessler et al. | 340/365 C |
| 3,701,958 | 10/1972 | Jaag | 361/414 |
| 3,898,421 | 8/1975 | Suammura | 200/159 B |
| 3,938,095 | 2/1976 | Check et al. | 364/900 |
| 3,978,457 | 8/1976 | Check et al. | 364/900 |
| 3,988,551 | 10/1976 | Larson | 200/5 A |
| 4,028,509 | 6/1977 | Zurcher | 200/5 A |
| 4,035,794 | 7/1977 | Norton et al. | 340/365 E |
| 4,078,257 | 3/1978 | Bagley | 340/365 VL |
| 4,081,898 | 4/1978 | Taylor et al. | 364/712 |
| 4,085,302 | 4/1978 | Zonk et al. | 200/5 A |
| 4,085,306 | 4/1978 | Dunlap | 200/5 A |
| 4,090,045 | 5/1978 | Marsh | 200/5 A |
| 4,096,364 | 6/1978 | Lynn et al. | 200/5 A |

FOREIGN PATENT DOCUMENTS 2025852 1/1980 United Kingdom .

OTHER PUBLICATIONS

Technical Bulletin, Molex, "10900 Series Membrane Switch".

Primary Examiner—James J. Groody
Attorney, Agent, or Firm—David E. Pitchenik; Albert W. Scribner; William D. Soltow, Jr.

[57] ABSTRACT

A shielded switch structure is disclosed. The switch structure is adapted for use in a system which is susceptible to being affected by electromagnetic radiation. The structure includes a conductive flexible sheet disposed adjacent to a plurality of switch contacts. The sheet is operable to enable a force applied to the sheet to actuate selected switch contacts. The shielded switch structure is mounted on a postage meter conductive housing. The housing includes a recessed area adapted to receive the keyboard. The conductive flexible sheet is positioned above the conductive housing recessed area and of a size so that the margins of the flexible sheet physically engage non recessed areas of the housing.

4 Claims, 4 Drawing Figures

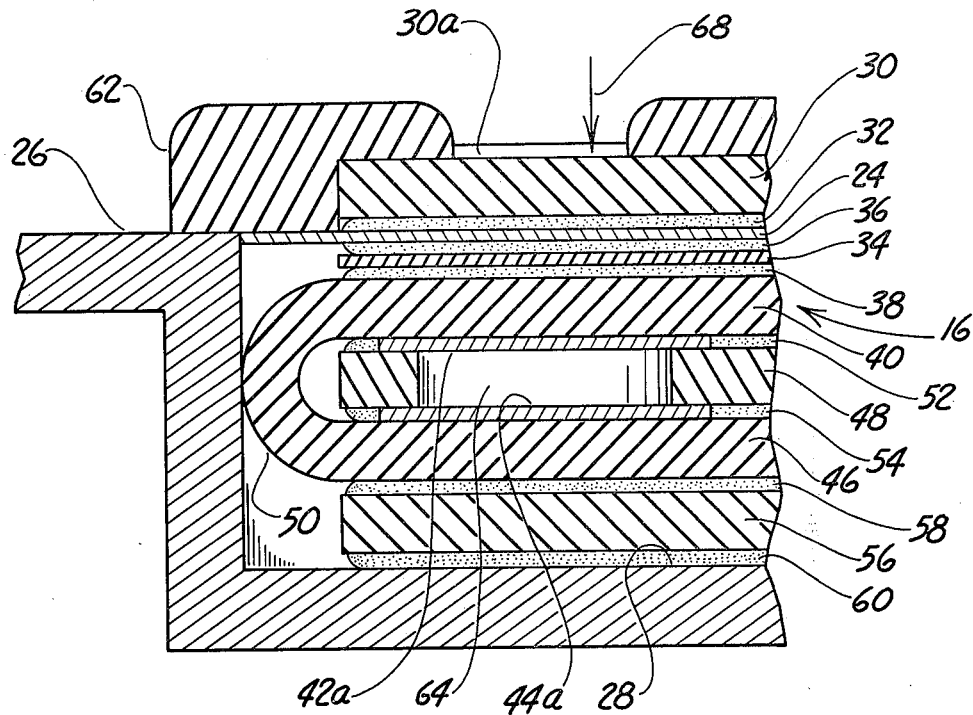
Fig. 2
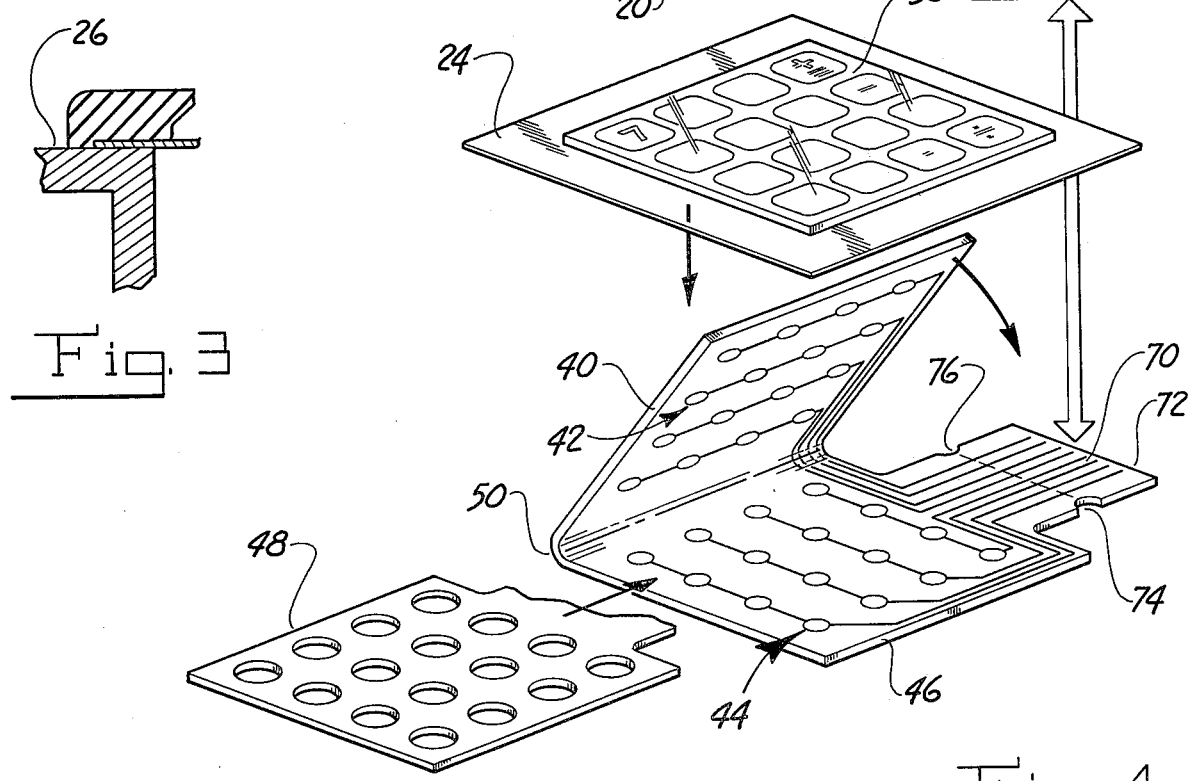
Fig. 3
Fig. 4

POSTAGE METER HAVING SHIELDED KEYBOARD TO PROTECT AGAINST ELECTROMAGNETIC RADIATION

FIELD OF THE INVENTION

The present invention relates to shielded keyboards and more particularly to shielded keyboards suitable for use in postage meters.

BACKGROUND OF THE INVENTION

Electronic postage meters have been developed with electronic accounting and other circuitry. Postage meter systems of this type are disclosed in U.S. Pat. No. 3,978,457 for Microcomputerized Electronic Postage Meter System and in U.S. Pat. No. 3,938,095 for Computer Responsive Postage Meter. Keyboards are provided in the electronic postage meters to allow the user to enter the amount of postage to be printed. The keyboards are also used to actuate various functions in the meter such as to recall for display the amount in the ascending register, which provides a total of all postage printed by the meter, and the amount in the descending register, which is the amount of the remaining postage which may be printed.

The electronic accounting circuits of the postage meter process the information which may be entered via the keyboard. The circuits include non-volatile memory capability for storing postage accounting information which are part of the postage meter registers. Programs for the proper operation of the meter are also stored in additional memory circuits. The memory and accounting circuits have replaced the function served in previous postage meters by mechanical accounting registers.

Electronic Postage Meters, similar to mechanical postage meters have a requirement for a high level of security. This is because the postage available for printing which is stored in the meter represents postage that has been previously purchased by a user from the postal services. As a result, the information stored in the registers has a monetary value. Accordingly, the meter must be made resistant against intentional or inadvertent unauthorized changes in the registers. If, for example, an unauthorized increase occurred in the meters descending register, then postage would be available to be printed for which payment has not been made. On the other hand, if an unauthorized decrease occurred in the meter's descending register, then postage would not be available for printing for which payment has been made.

Electromagnetic radiation interference can adversely affect the electronic postage meter. This radiation includes radiation in the radio frequency spectrum, which is generally considered to range from approximately 5 kilohertz to 106 megahertz. The radio frequency spectrum encompasses some audio frequencies, television frequencies, and radar frequencies. The radiation can result in a loss or a distortion of data or programs stored in the meter. This loss or distortion may result in the improper operation of the meter including the possible improper accounting for postage which has been printed or which is available to be printed. These affects can result in the meter being rendered totally inoperative.

It has been recognized that the affects of electromagnetic radiation on electronic postage meter circuitry can be eliminated by the use of shielding. Additional shielding has been provided in some cases for the internal critical portions of the meter such as the accounting circuit. The keyboard is one area where the electromagnetic radiation can enter the system. Keyboards, however, have been designed to prevent this from occurring. These keyboards operate satisfactorily for their intended purpose without being subject to the adverse affects of electromagnetic radition. However, such keyboards are an expense to manufacture and have a large number of moving parts.

Some prior art keyboards have employed non-ferrous metal shielding with openings for the switch actuators. The switch actuators project through the openings to effectuate operation of the switches. These openings are areas where electromagnetic radiation can enter the mechanism via the keyboard unless extreme care is taken in the specific design; for example, where the openings in the shielding are too large. Moreover, although non-ferrous metal shielding provides protection against electromagnetic radiation in the gamma ray and X-ray frequency bands, such shielding is not suitable protection against the affects of electromagnetic radiation in the radio frequency band.

SUMMARY OF THE INVENTION

The present invention provides a keyboard which is particularly suitable for use with all types of circuits which are susceptible to interference from electromagnetic radiation, and are intended to be shielded. The keyboard provides enhanced protection against electromagnetic radiation and is suitable for mass production techniques. As a result, the keyboard has a lower manufacturing cost over prior keyboards used in such environments.

The present invention also provides an improved shielded keyboard which protects the keyboard against electromagnetic radiation entering the interior of an electronic postage meter. The keyboard provides a shielding surface with no openings to allow entry of radiation into the internal areas of the meter because there are no openings through which moving parts project to cause a switch contact actuation. This reduces the construction constraints on the keyboard mechanism to prevent electromagnetic radiation penetration into the meter because the entire keyboard mechanism is shielded.

A switch embodying the present invention includes a first support means having a first side and a second side with a first conductive circuit means including plurality of contact areas supported on the first support means first side. A second insulating support means is also provided and has a first side and a second side with a second conductive circuit means including a plurality of contact areas supported on the second support means first side. The first and the second support means are disposed with their first sides facing opposite surfaces of an apertured insulating spacer. The support means are positioned so that contact areas of each of the first and second conductive circuits are adjacent opposite ends of apertures in the insulating spacer to form a plurality of contact pairs. A conductive sheet having a first side and a second side is positioned with the conductive sheet second side adjacent to the first support means second side. The conductive sheet is flexible to enable a force applied to the conductive sheet first side to be selectively transmitted to force a selected switch contact pair of a plurality of switch contacts into engagement.

In accordance with a feature of the present invention a system of the type which is susceptible to electromagnetic radiation has an electronic circuit means shielded in a conductive housing. Switch means are provided to enter information to control the operation of the circuit which includes a plurality of switch contacts electrically connected to the electronic circuit. A conductive flexible sheet is disposed above the plurality of switch contacts. The sheet is electrically connected to the conductive housing and is operable to enable a force applied to the conductive sheet to be transmitted to actuate selected switch contacts.

BRIEF DESCRIPTION OF THE DRAWINGS

A complete understanding of the present invention may be obtained from the following description of the preferred embodiment thereof, when taken in conjunction with the accompanying drawings, in which:

FIG. 2 is a partially enlarged sectional view of a keyboard embodying the present invention;

FIG. 3 is an enlarged partial sectional view of an alternate embodiment of the keyboard shielding and postage meter housing junction; and FIG. 4 is an exploded perspective view of some of the component parts of the keyboard shown in FIG. 2, and is helpful to an understanding of the present invention.

DESCRIPTION OF THE PREFERRED EMBODIMENT

Figure 1:
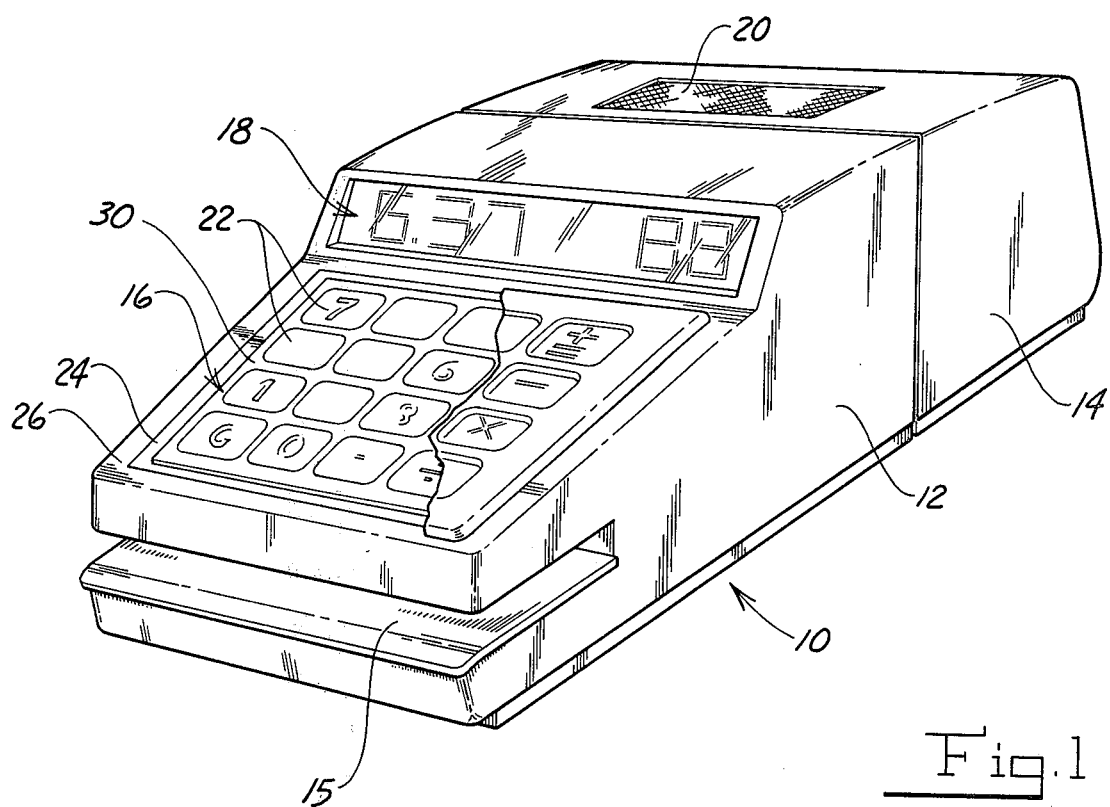
FIG. 1 is a perspective view of a postage meter with the keyboard's bezel partially broken away and have a keyboard embodying the present invention.

An electronic postage meter 10 is divided into two major portions. The first portion 12 houses critical components which require a high degree of security to make them resistant against intentional or unintentional tampering. A second portion 14 of the electronic postage meter houses portions of the meter which can be enclosed in a less secure housing. The particular construction of the postage meter housing and the internal component of the postage meter circuitry may be of conventional design. The meter includes circuitry to store programs to control the operation of the meter mechanism and to store postal information such as the amount of postage printed by the meter and the amount of postage remaining in the meter for subsequent printing. The term postage meter is used to refer to the general category of devices for imprinting a defined unit value for governmental or private carrier delivery of envelope or parcels, or other like application for unit value printing. Thus, the term is used as a general term for devices utilized in conjunction with services other than those exclusively employed by governmental postal services. The term encompasses, for example, private parcel or freight service meters.

The meter includes a slot 15 adapted to receive a mail piece. When a mail piece is inserted in the slot 15, it actuates a mechanism which causes an imprinting of postage on the mail piece. The amount of postage to be printed on the mail piece is entered into the meter via the keyboard 16 and is displayed on the meter display 18. The switch contacts of the keyboard 16, which are shown in FIGS. 2 and 3, are electrically connected to the postage meter circuitry and to a speaker 20. When any of the keys 22 of the keyboard are depressed, the speaker 20 emits an audible sound. This is particularly desirable in monolythic keyboards of the type where the movement to cause a switch actuation is extremely small relative to a prior art mechanical type switch mechanism. As will be explained in greater detail hereinafter, a stainless steel foil 24, which is part of the keyboard 16, operates with the meter housing top surface 26, to form a continuous ferrous metal surface which precludes the entry of electromagnetic radiation into the secure portion 12 of the meter.

Reference is now made to FIG. 2. The top surface 26 of the postage meter housing 10 is recessed to receive the keyboard 16. The keyboard 16 is thus substantially flush with the top surface of the meter surface. The ends of the metal foil 24 are in direct contact with the top surface 26, with no gaps therebetween. It should be noted that since the foil is flexible, the foil, as is shown in FIG. 3, can be constructed to overlap the top surface 26 if that should be desired. The lower portion of the keyboard 16 rests on the recessed surface 28 of the meter housing. The keyboard 16 includes a top cover 30, with printed keytop identification which is shown in FIG. 1. The top cover is secured by an adhesive 32 to the metal foil 24. Adhesive 36 and 38 on opposite sides of a spacer 36 secure the metal foil 24 to an insulating circuit board 40. The insulating circuit board 40 supports a conductive printed type pattern circuit 42 which is separated by an apertured insulating spacer 48 from a conductive printed type pattern circuit 44 supported on a second insulating circuit board 46.

The insulating circuit boards 40 and 46, for ease of construction, are formed from a single unitary sheet of insulating circuit board with a bend 50. However, separate insulating circuit of boards may be employed. The particular embodiment shown in FIGS. 2 and 4 involve a printed circuit conductive pattern which because of the unitary board construction can be fabricated as part of a single process. However, it should be noted that not only can separate non-continuous insulating circuit boards be utilized in accordance with the present invention, but also different types of circuit arrangements can be employed.

The insulating circuit board 40 is secured by a adhesive 52 to the apertured insulating spacer 48. The insulating circuit board 46 is, in a like manner, secured by adhesive 54 to the apertured insulating spacer 48. An adhesive spacer 56 secures the insulating circuit board 46 to the recessed surface 28 of the postage meter housing. Specifically, an adhesive layer 58 secures the insulating board 46 to the spacer 56 and an adhesive 60 secures the adhesive spacer 56 to the recessed surface 28. It should be noted that the conductive patterns 42 and 44 are positioned with respect to each other and to the apertured insulating spacer 48 to form a plurality of printed circuit switch contact pairs. The plurality of switches (switch contact pairs) are positioned under and correspond to the printed keytop identification on the top cover 30. A bezel 62 is provided to physically separate the keytop printed pattern on the top cover so that each switch identification is physically separated from other switch identifications to avoid an inadvertent switch actuation by a user. This is clearly shown in FIG. 2 where a printed circuit switch contact pair 42a and 44a are each disposed adjacent opposite sides of an aperture in the apertured insulating spacer 48 and under keytop cover identification area 30a.

When the top surface 30a of a particular switch pair identification area on the top cover is depressed in the direction of arrow 68, the top cover 30, the metal foil 24, the insulating adhesive spacer 34, and the insulating circuit board 40 flex sufficiently to cause switch contact 42a to project through aperture 64 and physically contact switch contact 44a. The physical contact results in an electrical continuity between the circuit pattern portion of conductive pattern 42 and the circuit portion of a conductive pattern 44. It should be noted that these two patterns form a switch matrix to electrically connect various leads which enter the keyboard by a conductive pattern 70 mounted on a projection 72 of the insulating circuit board 46. Two notches 74 and 76 are povided to allow the projection 72 to be folded so that it can be flexed into a position to engage a mating printed circuit board which is connected to postage meter circuits 78 internal to the meter 10. These circuits 78 are in turn connected to the postage meter speaker 20.

The approximate dimensions and materials of the keyboard shown in various FIGURES are listed below. These dimensions and materials are only by way of example and may be varied. One such example is the adhesive spacers 56 and 34 which are shown in the drawing as having differing thicknesses.

(1) all adhesives (32,36,38,52,54,58, and 60)—0.001 inch thick acrylic type adhesive.

(2) folded printed circuit board—0.005 inch (max.) thick polyester (such as DuPont mylar).

(3) apertured spacer—0.005 inch (max.) thick polyester (such as DuPont mylar).

(4) adhesive spacers 56 and 34—0.002 inch thick flexible soft plastic.

(5) Metal foil—0.001 inch thick stainless steel.

(6) top cover 30—0.006–0.008 inch thick polycarbonate (such as G. E. Lexan).

What is claimed is:

1. In a postage meter of the type adapted to imprint postage on a mail piece, a system comprising:

electronic circuit means for controlling the operation of said postage meter, said circuit means including means for accounting for postage which has been printed;

a conductive housing supporting said circuit means said conductive housing having a recessed area adapted to receive a keyboard means;

a keyboard means including switch means for entering data into said circuit means to effectuate operation of said postage meter, said switch means secured to said housing recessed area and including a plurality of switches electrically connected to said electronic circuit means;

said keyboard means further including a conductive flexible sheet disposed above and forming a continuous conductive surface covering all of said plurality of switches, said flexible conductive sheet electrically connected to said housing and positioned above said recessed area and of size so that the margins of said conductive flexible sheet physically engage non recessed areas of said housing and operable to enable a force applied to said conductive sheet to be transmitted to actuate a selected switch to affectuate operation of said postage meter.

2. A postage meter as defined in claim 1 wherein said flexible conductive sheet is fabricated from stainless steel having a thickness of approximately 0.001 inch to provide sufficient shielding for said accounting means to prevent loss of postage accounting information due to electromagnetic radiation.

3. A postage meter as defined in claim 1 including a top cover with a keytop switch identification pattern thereon, said cover positioned above and secured by an adhesive to said flexible conductive sheet and further positioned over corresponding switches so that a force applied to a particular key identification portion of said top cover will cause said flexible conductive sheet to operate a corresponding switch and bezel means positioned above said top cover, said bezel means having a plurality of appertures located to cooperate with said key top switch identification pattern to separate said key top switch identification pattern such that each switch identification is physically separated from other switch identifications to avoid an inadverture switch actuation by a user of any of said plurality of switches, said bezel means of a size such that its margins extend beyond said recessed area of said housing and said flexible conductive sheet and said bezel means margins engage non-recessed areas of said postage meter conductive housing.

4. A postage meter as defined in claim 1 including audible noise generating means adapted to be actuated to emit an audible noise, and said audible noise generating means electrically connected to said switch means such that actuation of any of said plurality of switches actuates said audible noise generating means to emit an audible noise.

* * * * *